United States Patent
Ohmori et al.

(10) Patent No.: US 7,979,190 B2
(45) Date of Patent: Jul. 12, 2011

(54) CONTROL SYSTEM

(75) Inventors: Takayuki Ohmori, Wako (JP); Hiromi Inagaki, Wako (JP); Osamu Yamamoto, Wako (JP); Takehiro Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 545 days.

(21) Appl. No.: 12/170,661

(22) Filed: Jul. 10, 2008

(65) Prior Publication Data

US 2009/0018739 A1    Jan. 15, 2009

(30) Foreign Application Priority Data

Jul. 12, 2007   (JP) .................................. 2007-183132

(51) Int. Cl.
*B60T 7/12* (2006.01)
*G06F 19/00* (2006.01)
(52) U.S. Cl. ............... 701/70; 701/78; 701/80; 303/154
(58) Field of Classification Search .................... 701/70, 701/34, 29, 78, 80; 303/154, 120, 20; 180/65.2, 180/243
See application file for complete search history.

(56) References Cited

U.S. PATENT DOCUMENTS

| 5,925,087 | A * | 7/1999 | Ohnishi et al. .................. 701/70 |
| 6,386,019 | B1 | 5/2002 | Eckert et al. |
| 6,755,489 | B2 | 6/2004 | Kuno et al. |
| 7,125,085 | B2 | 10/2006 | Ohsaki et al. |
| 2003/0221881 | A1 * | 12/2003 | Lee ............................. 180/65.2 |
| 2004/0012250 | A1 | 1/2004 | Kuno et al. |
| 2004/0204798 | A1 * | 10/2004 | Imada et al. ..................... 701/1 |
| 2006/0108868 | A1 | 5/2006 | Ohsaki et al. |

FOREIGN PATENT DOCUMENTS

| GB | 2404176 A | 1/2005 |
| JP | 3598491 | 9/2004 |

* cited by examiner

*Primary Examiner* — Tan Q Nguyen
(74) *Attorney, Agent, or Firm* — Rankin, Hill & Clark LLP (57) ABSTRACT

There is provided a control unit including a vehicle speed sensor for detecting a vehicle speed, a vehicle stop determination module for determining whether or not a vehicle is stopping based on a detection result of the vehicle sensor and a controller, wherein the controller operates an inclination component of gravity acceleration in a longitudinal direction of the vehicle on a road surface on which the vehicle is running based on an output of the power source detected by a power source output sensor and a brake torque detected by a brake torque sensors when the stop determination unit is determining that the vehicle is in a stopped state and controls either of the output of the power source and the brake force based on the result of the calculation when the vehicle starts.

5 Claims, 9 Drawing Sheets

CONTROL SYSTEM

BACKGROUND OF THE INVENTION

1. Field of the Invention

The present invention relates to a control of brake force or driving force for preventing a reverse motion/forward motion of a vehicle at the time of uphill/downhill starting.

2. Description of Related Art

In an automatic transmission having a torque converter, even with a throttle fully closed in the drive range, torque from the torque converter that is being driven by the engine which is running at idling speeds is transmitted to the vehicle, whereby the vehicle can creep. On the other hand, in automatic transmissions which has no torque converter but includes a CVT, an automatic manual transmission and a two-pedal (a clutch pedal-less) transmission, in many cases a control is implemented such that creep is enabled with the throttle fully closed in the drive range by the clutch being partially engaged.

When a vehicle comes to standstill on a slope, if a driver removes a pedal effort to allow for returning the brake pedal, brake hydraulic pressure of a master cylinder is decreased and the vehicle moves backwards.

To prevent this backward moving, the brake force needs to be changed in response to a change in driving force arising as the accelerator pedal is depressed without relying upon the brake hydraulic pressure of the master cylinder or the driving force needs to be changed without relying upon the depression of the accelerator pedal until the accelerator pedal is actually depressed. At this time, since a slope component of gravity acceleration differs depending upon an inclination angle of a slope, and brake force or driving force necessary to stop the vehicle is changed. Thus, the brake force or driving force needs to be controlled in accordance with the inclination angle of a slope. For this reason, the inclination angle of a road surface needs to be measured.

In many cases, a longitudinal acceleration sensor is installed to measure an acceleration at the time of braking, and its capacity is, for example, 1.5~2 G. On the other hand, for an example, the acceleration component which is generated on the road surface having the inclination angle of 1° is substantially G×sin (1°)=0.0175 G.

That is, the acceleration component at inclination angle of 1° corresponds to 1% of full scale of the longitudinal acceleration sensor. Therefore, if the installed longitudinal acceleration sensor, the longitudinal acceleration sensor is used at a lower limit of its resolving power. Therefore, it cannot be expected that the longitudinal acceleration sensor measure a road surface inclination with high accuracy.

In addition, it is costly to install a highly accurate sensor exclusively for measuring such an inclination angle. Additionally, since an inclination sensor is attached to a body, an additional separate unit becomes necessary for detecting the inclination of the body relative to the road surface in order to measure a road surface inclination angle accurately.

There is Japanese Patent Examined Publication JP-B-3598491 which discloses a technique related to preventing the backward movement of a vehicle at the time of slope starting. JP-B-3598491 describes that the vehicle is prevented from moving backwards in such a way that when the vehicle speed reaches 0 Km/h, even with an engine stopped, the brake hydraulic pressure is held so as to keep brake force exhibited, while when a brake pedal is released and the engine is automatically started, the brake force is gradually reduced.

However, the related art has the following problems since the brake force is not controlled or the driving force is not controlled as the pedal effort is removed to allow for the return of the brake pedal. When driving force is exhibited by depressing the accelerator pedal after the brake pedal has been released, in the event that the brake force is released too early, a sufficient driving force has not yet been exhibited at a point in time at which the brake force is released, and the slope component of the gravity acceleration becomes large compared with the driving force available then, leading to a problem that the vehicle is forced to move backwards.

In contrast, if the brake force is released too late, the drive force becomes equal to the slope component of the gravity acceleration and even if no brake force is provided, the brake force remains even at a point in time at which the vehicle is stopped, leading to a problem that brake dragging is generated.

Furthermore, if the brake force is controlled based on the inclination angle of a road surface, when an additional exclusive sensor for measuring an inclination angle is provided, this leads to a problem that costs are increased which are incurred in relation to prevention of the backward movement of a vehicle at the time of slope starting. In addition, if the longitudinal acceleration sensor is used to calculate an inclination angle, an accuracy problem is caused, and the backward movement of the vehicle cannot be prevented with high accuracy.

Since JP-B-3598491 is not such that the brake force is controlled in accordance with driving torque and the slope component of gravity acceleration, there were similar problems to those described just above.

SUMMARY OF THE INVENTION

The invention has been made in view of the problems and an object thereof is to provide a control unit for preventing a reverse downward movement of a vehicle at the time of slope starting not by measuring an inclination angle by a sensor but by calculating a slope component of gravity acceleration on a road surface and controlling brake force or driving force based on the slope component of gravity acceleration on the road surface so calculated.

According to a first aspect of the invention, there is provided a control system including:

a power source;

a power source output sensor for detecting an output from the power source;

a power source controlling unit adapted to be operated by a driver to control the output of the power source, wheel brakes;

a brake operating unit adapted to be operated by the driver to operate the wheel brakes;

brake torque sensors which detects a brake torque being generated at the wheel brakes and a controller which controls an actuator for controlling the output of the power source and brake force of the wheel brakes, a vehicle speed sensor for detecting a vehicle speed; and a vehicle stop determination unit which determines a stopped state of a vehicle based on a result of a detection by the vehicle speed sensor, wherein when the stop determination unit determines that the vehicle is in a stopped state, the controller calculates an inclination component of gravity acceleration in a longitudinal direction of the vehicle on a road surface on which the vehicle is running based on an output of the power source detected by the power source output sensor and a brake torque detected by the brake torque sensors and the controls either of the output of the power source and the brake force based on the result of the calculation when the vehicle starts based on an calculation of the brake operating unit and calculation of the power source controlling unit.

According to a second aspect of the invention, there is provided the control system as set forth in the first aspect of the invention, wherein until the power source controlling unit is operated by the driver, the controller controls the actuator to hold constant a brake force at the wheel brakes that is required for stopping the vehicle from a predetermined point in time at which the brake force at the wheel brakes is decreased to a predetermined value based on a brake operation resulting from the operation of the brake operating unit by the driver and once the power controlling unit is operated, the controller controls the actuator to cause a brake force at the wheel brakes that is required for stopping the vehicle to be exhibited based on a driving force that is exhibited based on the calculation of the power source controlling unit by the driver and the inclination component.

According to a third aspect of the invention, there is provided the control system as set forth in the first aspect of the invention, wherein when the brake force at the wheel brakes is decreased based on a brake operation resulting from the operation of the brake operating unit by the driver, the controller controls the actuator to cause a driving force that is required for stopping the vehicle to be exhibited based on a brake torque detected by the brake torque sensors and the inclination component.

According to a fourth aspect of the invention, there is provided the control system as set forth in the first aspect of the invention, wherein an output Fd of the power source that is used in calculation of the inclination component is a value obtained by:
  calculating a driving torque Td based on a torque converter amplifying rate that is defined based on an engine revolutions and a main shaft rotation speed and
  multiplying the driving torque Td by a gear ratio and a final reduction gear ratio of a transmission
  dividing the multiplied value by a product of a radius of a tire and a load thereon.

According to a fifth aspect of the invention, there is provided the control system as set forth in the first aspect of the invention, wherein a brake torque Fb that is used in calculation of the inclination component is a total sum of brake forces acting on individual wheels which are each obtained by dividing a brake torque Tb detected by the brake torque sensors by a product of a load and a brake disc effective radius of the wheel.

According to the first aspect of the invention, when the vehicle is stopped, the controller calculates the inclination component of gravity acceleration in the longitudinal direction of the vehicle on the road surface on which the vehicle is running based on the output of the power source detected by the power source output sensor and the brake torque detected by the brake torque sensors and when the vehicle starts, based on the result of the calculation the controller controls either of the output of the power source and the brake force.

Therefore, the start control can be implemented in accordance with the inclination of the road surface which requires no inclination sensor for detecting the slope of the road surface and which is free from brake dragging and movement reverse to the traveling direction.

According to the second aspect of the invention, while the brake force at the wheel brakes is reduced when the brake operating unit is operated to be released, the brake torque required for stopping the vehicle is held constant from the predetermined point in time at which the brake force at the wheel brakes is reduced until the power source controlling unit is operated by the driver. Therefore, there occurs no situation in which the vehicle reverses.

In addition, the actuator is controlled to cause the brake force at the wheel brakes that is required for stopping the vehicle to be exhibited based on the operating amount of the power source controlling unit by the driver and the inclination component once the power controlling unit is operated. Therefore, the start control can be implemented which is free from brake dragging and movement reverse to the traveling direction.

According to the third aspect of the invention, when the brake operating unit is operated to be released, the actuator is controlled to cause the driving force required for stopping the vehicle to be exhibited based on the brake torque detected by the brake torque sensors and the inclination component. Therefore, even when the brake operating unit is operated to be released, there occurs no situation in which the vehicle reverses relative to the traveling direction until the power source controlling unit is operated.

In addition, when the power source controlling unit is operated, the start control can be implemented which is free from bake dragging and reverse movement relative to the traveling direction.

DETAILED DESCRIPTION OF THE PREFERRED EMBODIMENTS

Figure 1:
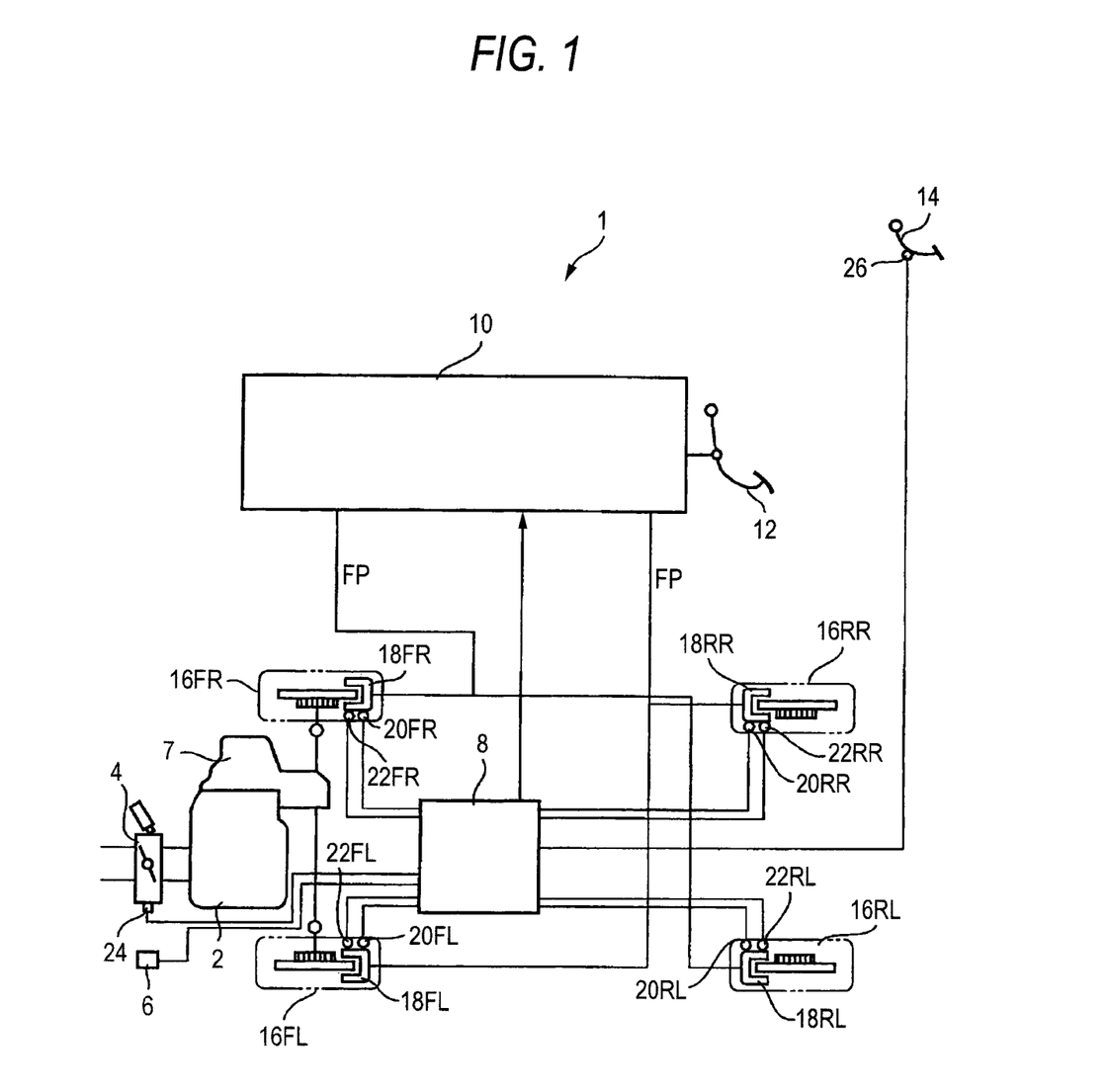
FIG. 1 is a schematic block diagram of a vehicle system to which the invention is applied.

FIG. 1 is a schematic block diagram showing a vehicle brake system and drive system according to an embodiment of the invention.

As shown in FIG. 1, a vehicle body 1 includes an engine 2, a throttle valve 4, a throttle valve driving unit 6, an automatic transmission 7, an ECU 8, a hydraulic brake system 10, a brake pedal 12, an accelerator pedal 14, a left front wheel 16FL, a right front wheel 16FR, a left rear wheel 16RL, a right rear wheel 16RR, a left front wheel brake 18FL, a right front wheel brake 18FR, a left rear wheel brake 18RL, a right rear wheel brake 18RR, a left front wheel brake torque sensor 20FL, a right front wheel brake torque sensor 20FR, a left rear wheel brake torque sensor 20 RL, a right rear wheel brake torque sensor 20RR, a left front wheel speed sensor 22FL, a right front wheel speed sensor 22FR, a left rear wheel speed sensor 22RL, a right rear wheel speed sensor 22RR, a throttle position sensor 24 and an accelerator pedal position sensor 26.

The engine 2 and the automatic transmission 7 are mounted in a front part of the vehicle body 1 so as to drive the left front wheels 16FL and the right front wheels 16FR which constitute driving wheels.

The ECU 8 controls the throttle valve driving unit 6 to exhibit a driving force in accordance with a depressing amount of the accelerator pedal 14 by the driver which is detected by the accelerator pedal position sensor 26. In addition, as will be described later, in the automatic transmission 7 which has no torque converter, a starter clutch is partially engaged in a drive range even when the vehicle body 1 is stopped to control a creeping torque to be exhibited.

In addition, in slope starting, when the vehicle is stopped, a driving torque Td is calculated based on throttle position, engine revolutions. If the automatic transmission 7 having a torque converter is used, in addition to the throttle position and the engine revolutions, torque converter amplifying rate is considered at the calculation of driving torque Td, the torque converter amplifying rate is defined based on engine revolutions and main shaft rotation speed;

a driving force Fd (N/kg) is calculated by dividing a product value, which is obtained by multiplying the driving torque Td by a gear ratio and a final reduction gear ratio of the automatic transmission 7, by radius of a tire and a load thereon respective brake force, which are applied to respective wheel brakes 16FL through 16RR, are calculated by dividing respective brake torque Tb, which is detected by each of the brake torque sensors 20FL through 20RR, by the load thereon and a brake disc effective radius of the wheel;

a total sum of brake force Fb (N/kg) is calculated by adding the respective thus calculated brake force and a slope component Fg (N/kg) is calculated based on the thus calculated driving force Fd and the total sum of the brake force Fb.

When the pedal effort is removed to allow for the return of the brake pedal 12, the brake hydraulic pressure at the wheel brakes 18FL to 18RR are gradually reduced to reach a value equal to or less than a brake force Fb which was applied when the vehicle body 1 is stopped. At this time, although the brake hydraulic pressure tends to be continuously lowered, the hydraulic brake system 10 is controlled to hold this brake hydraulic pressure until the driver depresses the accelerator pedal 14.

When the driver depresses the accelerator pedal 14, a driving torque Td which is exhibited in response to the depression of the accelerator pedal is calculated in a similar manner to that described above, the driving torque Td so calculated is divided by the product of the load and the radius of the tire to calculate a driving force Fd exerted on the vehicle body 1, and the hydraulic brake system 10 is controlled to be driven so as to supply a brake torque corresponding to a target brake force Fb* which is necessary to stop the vehicle individually to the wheel brakes 18FL, 18FR, 18RL, 18RR based on the uphill slope component Fg of gravity acceleration and the driving force Fd.

Figure 2:
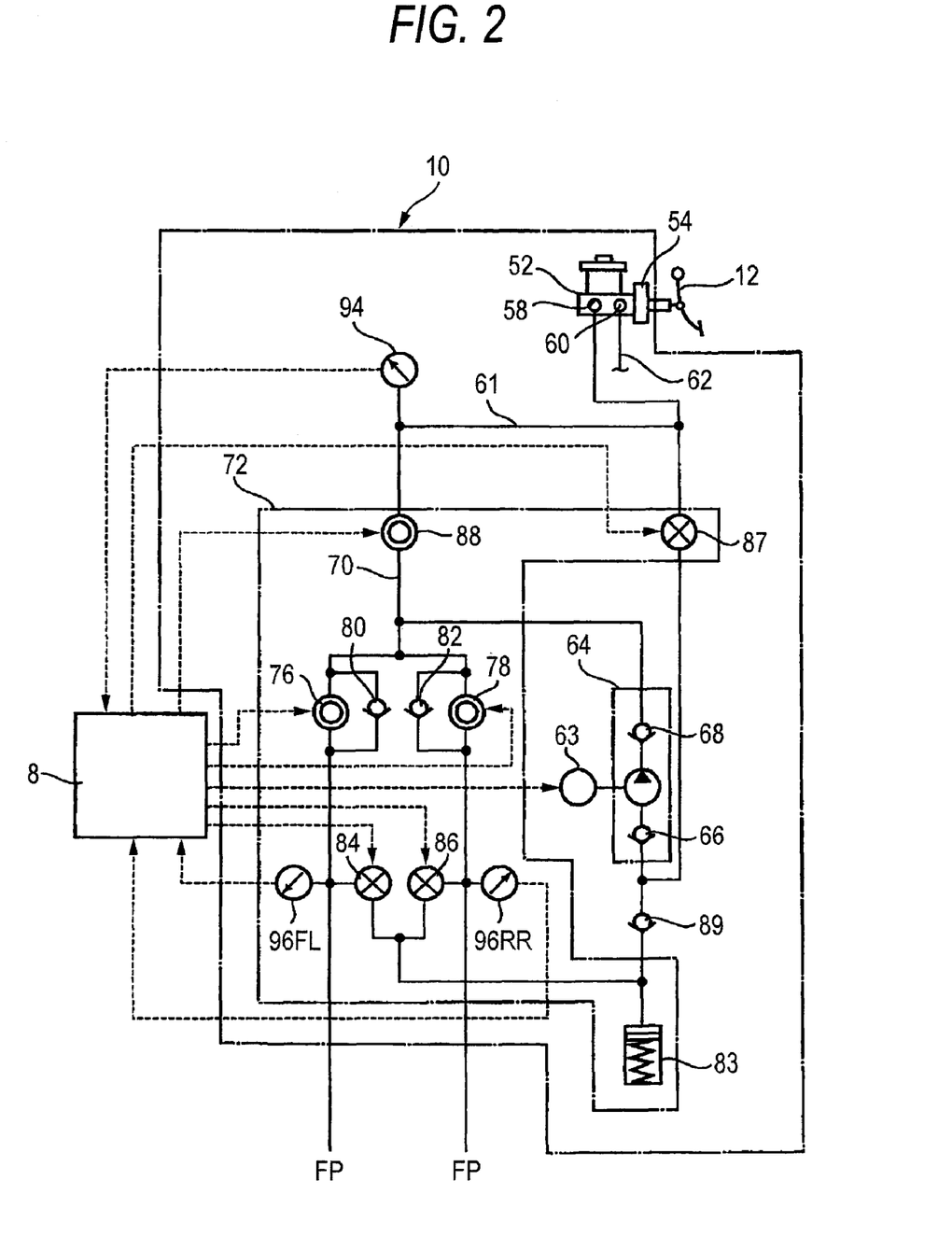
FIG. 2 is a block diagram of a hydraulic brake system in FIG. 1.

A brake pedal operating effort is inputted from the brake pedal 12 into a master cylinder 52 of the hydraulic brake system 10 via a vacuum booster 54. The master cylinder 52 is made into a tandem type and hence includes an output port 58 which deals, for example, with the right front wheel brake 18FR and the left rear wheel brake 18RL and an output port 60 which deals with the left front wheel brake 18FL and the left rear wheel brake 18RL, and hydraulic pipe lines 61, 62 are connected, respectively, to the output ports 58, 60. Since a brake system on the output port 58 side and a brake system on the output port 60 side of the hydraulic brake system 10 have the same configuration, the brake system on the output port 58 side will be described, and the description of the brake system on the output port 60 side will be omitted. The wheel brakes 18FL to 18RR are connected to the hydraulic brake system 10 by means of a hydraulic pressure piping FP.

An output hydraulic pressure from the master cylinder 52 can be increased by a pump 64 which has a suction valve 66 and a discharge valve 68 and which is driven by a motor 63, and the discharge valve 68 is connected to the hydraulic pipe line 61.

A regulator unit 72 is provided between a hydraulic pipe line 70 and the wheel brakes 18FL, 18RR. This regulator unit 72 includes: a normally open proportional solenoid valve 88 which is provided between the hydraulic pipe line 61 and the hydraulic pipe line 70; a normally closed solenoid valve 87 which is provided between the hydraulic pipe line 61 and a check valve 89; a normally open solenoid valve 76 which is provided between the left front wheel brake 18FL and the hydraulic pipe line 70; a normally open solenoid valve 78 which is provided between the right rear wheel brake 18RR and the hydraulic pipe line 70; a pair of one-way valves 80, 82 which are made to permit a flow of pressurized brake fluid from the wheel brakes 18FL, 18RR to the hydraulic pipe line 70 and is connected in parallel, respectively, with the normally open solenoid valves 76, 78; a reservoir 83 and normally closed solenoid valves 84, 86 which are provided, respectively, between the wheel brakes 18FL, 18RR and the reservoir 83.

The reservoir 83 is connected to the suction valve 66 via the check valve 89.

When the brakes are applied, the regulator unit 72 supplies an output of the master cylinder 52 to the wheel brakes 18FL, 18RR via the hydraulic pipe line 70 and the hydraulic pressure piping FP by opening the normally open proportional solenoid valve 88 and the normally open solenoid valves 76, 78 and closing the normally closed solenoid valves. The regulator unit 72 holds the brake pressure at the wheel brakes 18FL to 18RR by closing the normally closed solenoid valve 87, closing the normally open proportional solenoid valve 88, opening the normally open solenoid valves 76, 78 and closing the normally closed solenoid valves 84, 86.

The regulator unit 72 releases the wheel brakes 18FL to 18RR from this brake pressure holding state by closing the normally open solenoid valves 76, 78 and opening the normally closed solenoid valves 84, 86. The regulator unit 72 releases gradually the brake hydraulic pressure in the hydraulic pressure piping FP towards the master cylinder 52 by closing the normally closed solenoid valve 87, opening the normally open solenoid valves 76, 78, closing the normally closed solenoid valves 84, 86 and gradually opening the normally open proportional solenoid valve 88 by controlling the energization amount of the normally open proportional solenoid valve 88.

Furthermore, while the brakes are not applied, the regulator unit 72 discharges towards the hydraulic pipe line 70 brake fluid pressurized by the pump 64 taking in brake fluid from the master cylinder 52 through actuation of the motor 63 in such a state that the normally closed solenoid valve 87 is closed, the normally open proportional solenoid valve 88 and the normally open solenoid valves 76, 78 are opened and the normally closed solenoid valves 84, 86 are opened. In this state, by closing the normally open proportional solenoid valve 88, closing the normally closed solenoid valves 84, 86, opening the normally open solenoid valve of the normally open solenoid valves 76, 78 which corresponds to the wheel brake to which a braking force is about to be imparted, and closing the other normally open solenoid valve, the regulator unit 72 exerts a brake hydraulic pressure on to the wheel brake to which a braking force is to be imparted, whereby brake force is made to be exhibited.

The hydraulic pipe line 61 is connected to an intermediate position between the suction valve 66 and the check valve 89 via the normally closed solenoid valve 87 and is connected to the hydraulic pipe line 70 via the normally open proportional solenoid valve 88.

On and off operations of the motor 63 for driving the pump 64, opening and closing operations of the normally open solenoid valves 76, 78 and the normally closed solenoid valves 84, 86 of the regulator unit 72, opening and closing operations of the normally closed solenoid valve 87 and control of the opening and closing amount and fully opening and fully closing operations of the normally open proportional valve 88 based on energization amount are controlled by the ECU 8.

The wheel brakes 18FL, 18FR, 18RL, 18RR exhibit a brake force in accordance with a brake hydraulic pressure supplied thereto from the hydraulic brake system 10.

The brake torque sensors 20FL, 20FR, 20RL, 20RR are provided on portions of members, not shown, which lie under suspension springs where strain is produced by brake torque when the brakes are applied for detecting brake torque generated by the wheel brakes 18FL, 18FR, 18RL, 18RR when they work.

The wheel speed sensors 22FL, 22FR, 22RL, 22RR are sensors for detecting rotational speeds of the wheels 16FL, 16 FR, 16RL, 16RR. The throttle position sensor 24 is a sensor for detecting the degree of opening or position of the throttle valve 4. The accelerator pedal position sensor 26 is a sensor for detecting the degree of opening or position of the accelerator pedal 14. Outputs of the sensors 20FL to 20RR, 22FL to 22RR, 24, 26 are inputted into the ECU 8.

Figure 3:
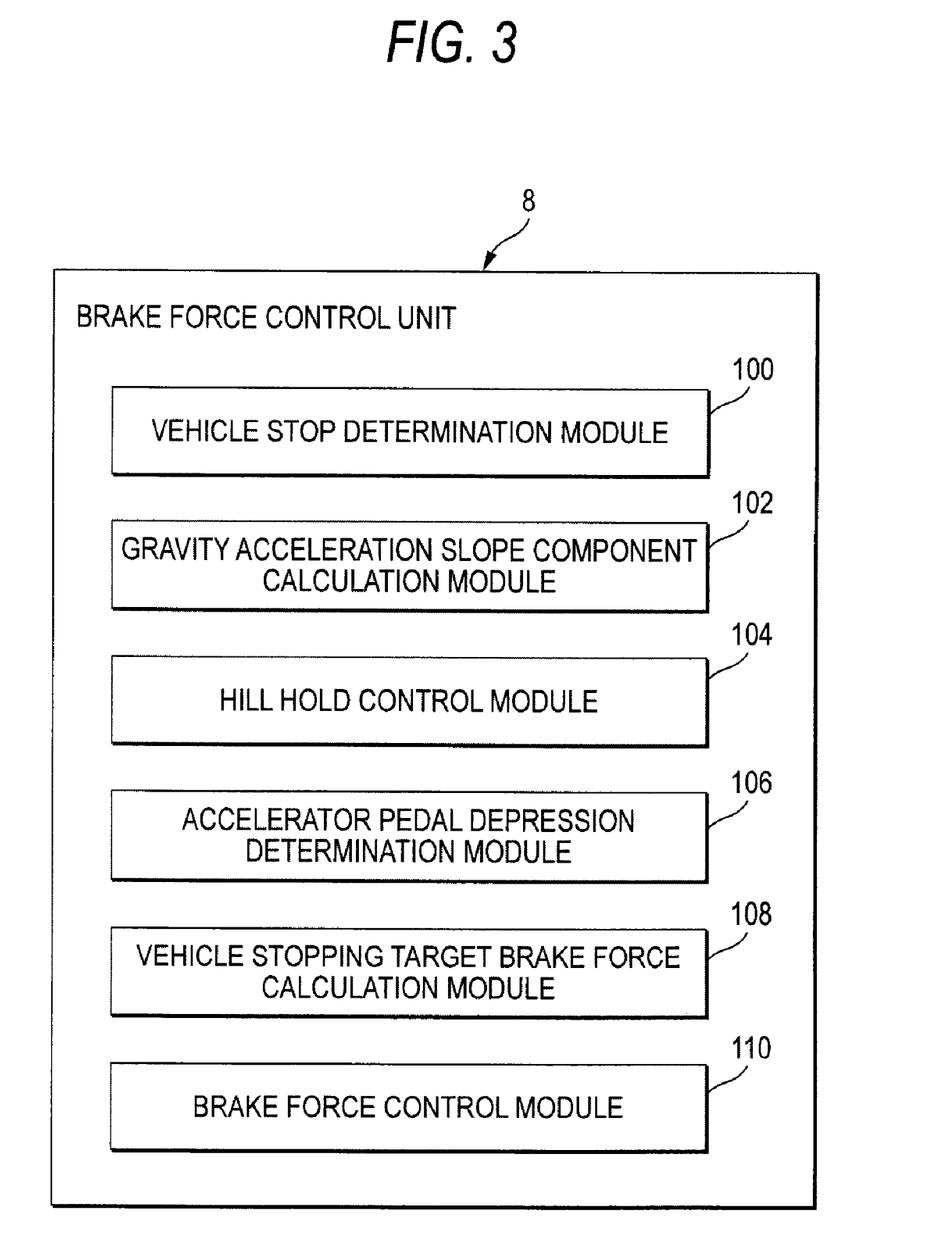
FIG. 3 is a block diagram showing a brake force control according to a first embodiment of the invention.

FIG. 3 is a functional block diagram in relation to a brake force control by the ECU 8 according to the first embodiment. As shown in FIG. 3, the ECU 8 includes a vehicle stop determination module 100, a gravity acceleration slope component calculation module 102, a hill hold control module 104, an accelerator pedal depression determination module 106, a vehicle stopping target brake force calculation module 108 and a brake force control module 110.

The vehicle stop determination module 100 determines whether or not the vehicle body 1 is stopping on a slope. The vehicle body 1 is determined as stopping when wheel speeds detected by the wheel speed sensors 22FL to 22RR are 0. In addition, a slope is determined by detecting that the brake pedal 12 is being depressed and brake torques detected by brake torque sensors 20FL to 20RR are acting in the same direction as a direction as the driving torque acting on the vehicle body 1, that is, a traveling direction on an uphill and a reverse direction on a downhill. Consequently, a stop on a flat road is out of consideration since directions in which brake torque and driving torque are exerted are opposite.

When the vehicle stop determination module 100 determines that the vehicle is stopping, the gravity acceleration slope component calculation module 102 calculates a slope component $Fg(N/kg)$ of gravity acceleration G as follows. Here, the slope component Fg may be regarded as a force (N) acting on a load W in the direction of a slope.

Figure 4A:
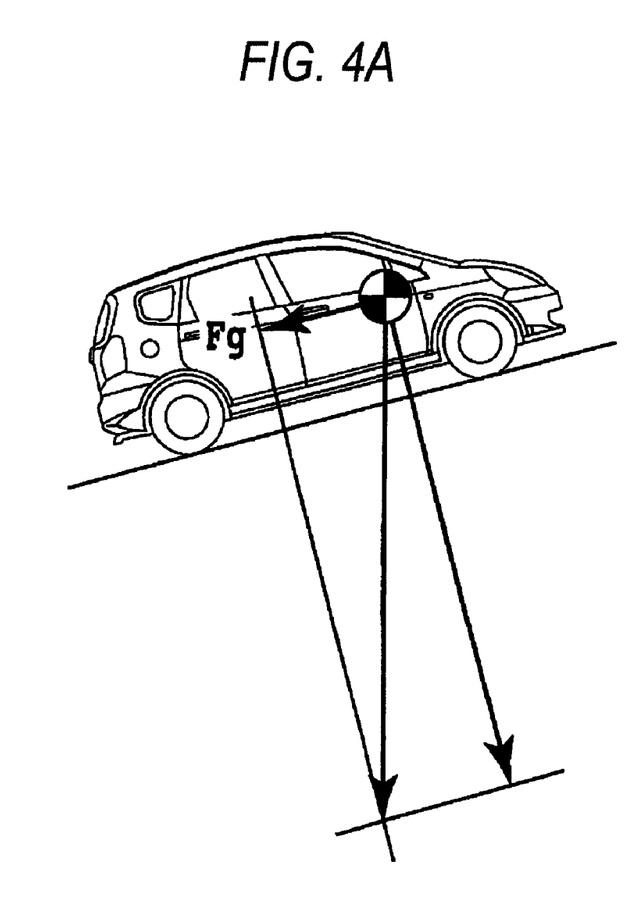
FIG. 4A is a drawing showing a principle of the invention.

FIG. 4 is a drawing showing a relationship between slope component $Fg(N/kg)$, driving force $Fd(N/kg)$ and brake force $Fb(N/kg)$. As is shown at in FIG. 4A, gravity acceleration $G(N/kg)$ is decomposed into a slope component Fg which is parallel to the slope and a component which is vertical to the slope.

Figure 4B:
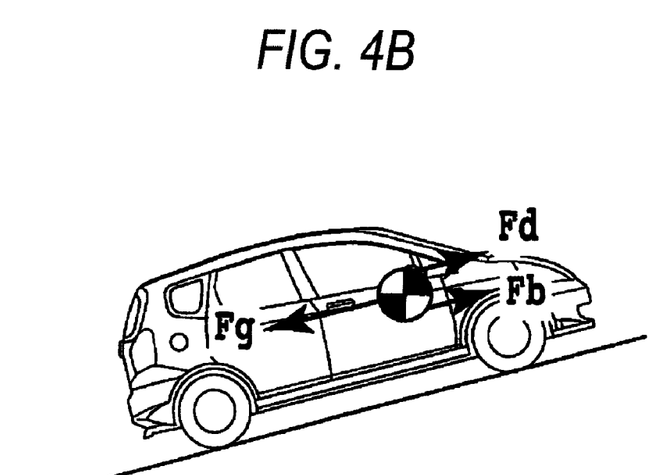
FIG. 4B is a drawing showing a principle of the invention.

As is shown in FIG. 4B, when the vehicle is traveling forwards on an uphill, since the driving force Fd and the slope component Fg are forces acting in opposite directions, the brake force Fb acts on the wheels 18FL to 18RR in the same direction as the driving force Fd, and the vehicle body 1 stops when the following equation (1) is established. Here, the brake force Fb is a brake force acting on the vehicle body 1 and is a total sum of brake forces acting individually on the wheels 16FL to 16RR. In addition, the driving force Fd is a driving force acting on the vehicle body 1 and is a sum of driving forces which individually act on the main or driving wheels FL, FR.

$$Fg=Fd+Fb \qquad (1)$$

Figure 4C:
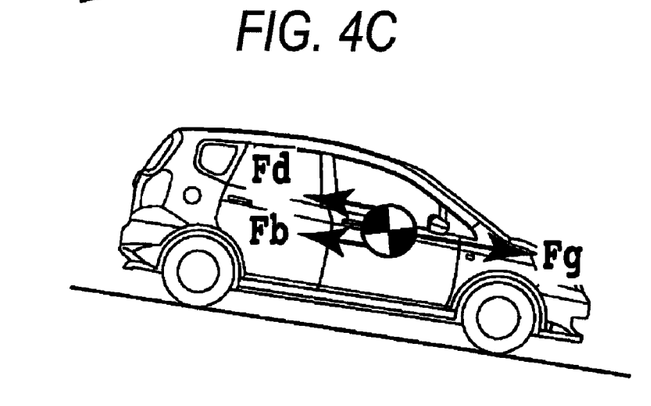
FIG. 4C is a drawing showing a principle of the invention.

In addition, as is shown in FIG. 4C, when the vehicle is reversing on a downhill, since the driving force Fd and the slope component Fg are acting in opposite directions, the brake force Fb acts on the wheels 18FL to 18RR in the same direction as the driving force Fd, and as in the case of the vehicle traveling forwards on the uphill, the vehicle body 1 stops when the following equation (2) is established.

$$Fg=Fd+Fb \qquad (2)$$

The driving force $Fd(N/kg)$ is obtained by dividing a product of rotational or engine revolutions of the engine 2, throttle position, in the case of the automatic transmission 7 having a torque converter, a torque converter amplifying rate that is calculated based on engine revolutions and main shaft rotation speed or, in the case of the automatic transmission 7 having no torque converter, driving torque Td that is calculated from an engaged amount of the clutch and gear ratio and final reduction gear ratio of the automatic transmission 7 by a product of the radius of a tire on the wheel and a load thereon. Here, the load is wheel load which is the load applied to respective wheels due to weight of the vehicle.

In addition, the brake force $Fb(N/kg)$ is calculated by dividing a total sum of brake torques detected by the brake torque sensors 20FL to 20RR by an effective radius of the brake disc and the load W.

Consequently, the gravity acceleration slope component calculation module 102 calculates the driving force Fd and the brake force Fb in the manners described above and calculates the gravity acceleration slope component Fg based on the equations (1) and (2) above. In addition, since the forward traveling on the uphill and the reversing on the downhill are the same, the forward traveling on the uphill will be described.

When determining that the brake hydraulic pressure in the master cylinder 52 is decreasing as a result of the removal of pedal effort by the driver to allow for the return of the brake pedal 12 and any further decrease in brake hydraulic pressure cannot hold the stop of the vehicle body 1 by virtue of the brake force Fb generated by the currently available brake hydraulic pressure (when determining that the brake force Fb is starting to decrease), the hill hold control module 104 holds the brake pressures at the wheel brakes 18FL to 18RR by closing the normally closed solenoid valve 87, opening the normally open solenoid valves 76, 78, closing the normally closed solenoid valves 84, 86 and closing the normally open proportional solenoid valve 88. Thus, the brake force Fb is held and the stop of the vehicle body 1 is maintained.

The accelerator pedal depression determination module 106 determines whether or not the driver depresses the accelerator pedal 14 based on an accelerator pedal position detected by the accelerator pedal position sensor 26.

When the accelerator pedal depression determination module 106 determines that the accelerator pedal 14 has been depressed, the throttle position of the throttle valve 14 is controlled by the throttle valve driving unit 6 in accordance with the accelerator position detected by the accelerator pedal position sensor 26 so as to increase the amount of air flow, whereby the driving torque Td is increased. The vehicle stopping target brake force calculation module 108 calculates this driving torque Td from the engine revolutions and the throttle position detected by the throttle position sensor 24. Then, the driving force Fd is calculated based on this driving torque Td using the gear ratio and the final reduction gear ratio of the automatic transmission 7, the tire radius and the load. In addition, a target brake force Fb* that is necessary to maintain the stop of the vehicle body 1 is calculated by the following equation (3).

$$Fb^* = Fg - Fd \quad (3)$$

The brake force control module 110 stores a table associating brake forces with energization amounts of the normally open proportional solenoid valve 88 for exhibit desired brake forces, in advance.

The brake force control module 110 closes the normally closed solenoid valve 87; opens the normally open solenoid valves 76, 78; closing the normally closed solenoid valves 84, 86 and drives the normally open proportional solenoid valve 88 with the energization amount determined by the stored table, which is suitable for producing a brake hydraulic pressure necessary to cause the target brake force Fb* to be exhibited so as to open the normally open proportional solenoid valve 88 in a gradual fashion. As a result, the flow amount of pressurized brake fluid from wheel cylinders of the wheel brakes 18FL to 18RR to the master cylinder 52 where the brake hydraulic pressure is decreasing by the release of the brake pedal 12 is controlled and the target brake force Fb* is exhibited.

By this action, the brake hydraulic pressures in the wheel cylinders decrease gradually in association with the increase in driving force as a result of the depression of the accelerator pedal 14 to thereby produce the vehicle stopping target brake force Fb*, whereby Equation (3) is established, and the stopping state of the vehicle body 1 is maintained.

When the depressing amount of the accelerator pedal 14 by the driver is increased and the driving torque Fd coincides with the slope component Fg, since the target brake force Fb* becomes zero from Equation (3), the normally open proportional solenoid valve 88 is fully opened, and the brake force becomes zero.

Figure 5:
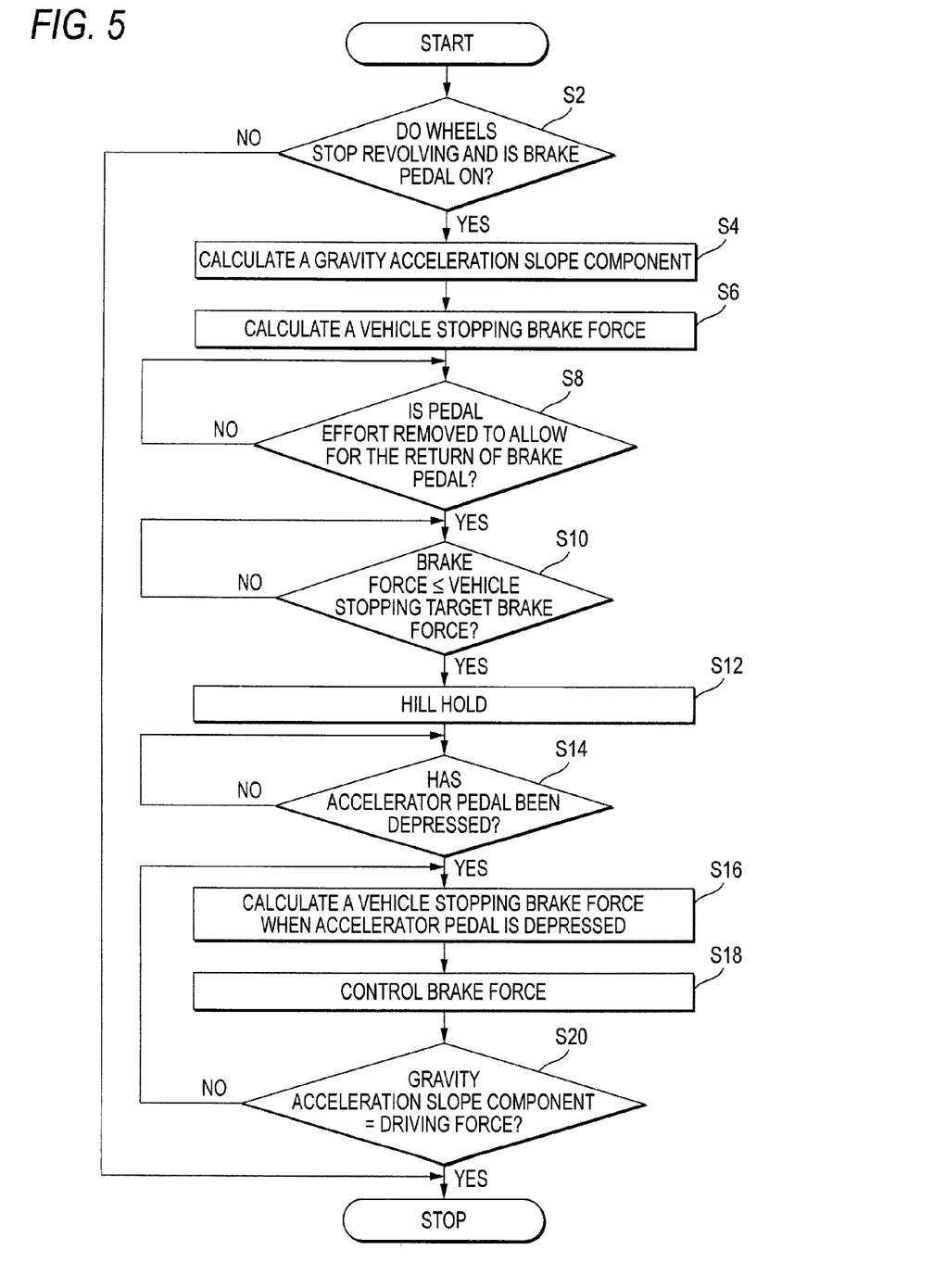
FIG. 5 is a flowchart illustrating a brake force control method according to the first embodiment of the invention.
Figure 6:
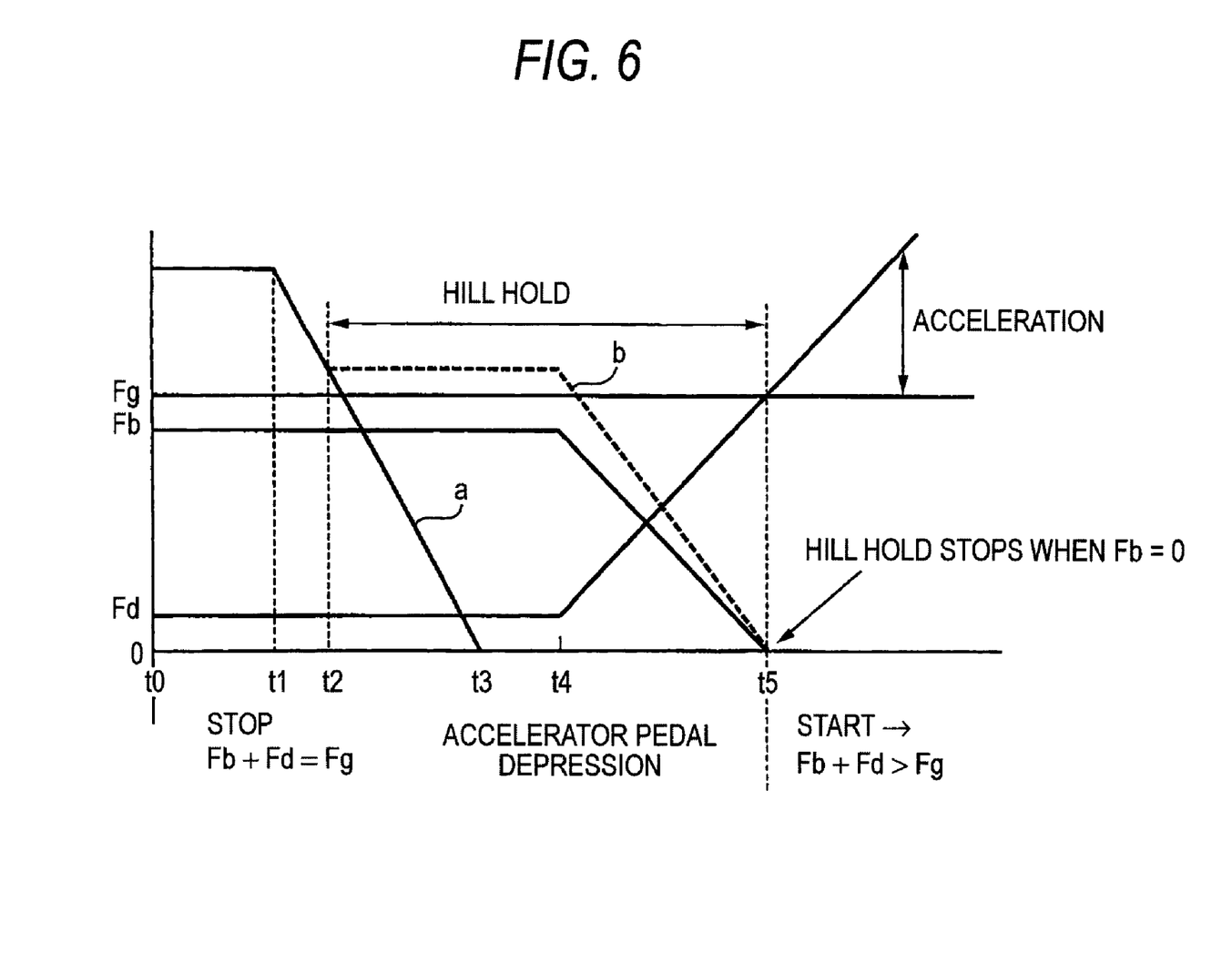
FIG. 6 is a time chart illustrating the brake force control method according to the first embodiment.

FIG. 5 is a flowchart illustrating a brake force control method. FIG. 6 is a time chart illustrating the brake force control method.

In FIG. 6, a reference character "a" denotes a master cylinder hydraulic pressure which is converted into a force which is exerted on the brake disc by the hydraulic pressure in the master cylinder 52, and reference character "b" denotes a brake hydraulic pressure which is converted into a force which is exerted on the brake disc by the hydraulic pressure in the wheel cylinder. Hereinafter, a brake force control method will be described by reference to these drawings.

At step S2, it is determined whether or not wheel speeds detected by the wheel speed sensors 22FL, 22FR, 22RL, 22RR are 0 and the wheels stop revolving and whether or not the brake pedal 12 is being depressed. If it is determined positive, judging that the vehicle body 1 is stopping on an uphill, the flow of controlling steps then proceeds to step S4, whereas if it is determined negative, the flow ends. It is assumed that it has been determined that the wheels stop revolving, for example, at time t0 and that the brake pedal 12 is being depressed. In this state, the brake pedal 12 is depressed strongly, and a brake hydraulic pressure which is equal to or more than a brake hydraulic pressure necessary to exhibit a brake force Fb required to stop the vehicle body 1 is acting on the wheel brakes 18FL to 18RR.

At step S4, the driving force Fd(N/kg) is calculated by dividing the driving torque Td which is calculated based on engine revolutions, throttle position, torque converter amplifying rate or clutch engaged amount by the product of the gear ratio and the final reduction gear ratio of the automatic transmission 7, the radius of the tire and the load. Also, the brake force Fb(N/kg) is calculated by dividing the total sum Tb of the brake torques detected by the brake torque sensors 20FL to 20RR by the product of the disc effective radius and the load, and the slope component Fg(N/kg) is calculated from Equation (1). In addition, the driving force Fd calculated here is such as to result from creeping torque generated when the accelerator pedal 14 is fully closed or released.

At step S6, the brake force Fb detected at step S4 is regarded as the vehicle stopping target brake force Fb*. At step S8, it is determined whether or not the pedal effort is removed to allow for the return of the brake pedal 12, and if the determination is positive, the flow proceeds to step S10, whereas if it is determined negative, the flow waits at step S8. It is understood that the removal of pedal effort to allow for the return of the brake pedal 12 is started, for example, at time t1.

At step S10, it is determined whether or not the brake force which is the total sum which is calculated from the brake torques detected by the brake torque sensors 20FL to 20RR becomes equal to or less than the vehicle stopping target brake force Fb*. If it is determined positive, the flow proceeds to step S12, whereas if it is determined negative, the flow waits at step S10. It is understood that the brake torque becomes equal to or less than the vehicle stopping target brake force Fb*, for example, at time t2.

At step S12, the brake pressures at the wheel brakes 18FL to 18RR are held by closing the normally closed solenoid valve 87, opening the normally open solenoid valves 76, 78, closing the normally closed solenoid valves 84, 86 and closing the normally open proportional solenoid valve 88. At time t2, the brake hydraulic pressures at the wheel cylinders are held, and a hill hold is started. At time t3, although the brake pedal 12 is released, and the brake hydraulic pressure in the master cylinder 52 becomes such as to correspond to a brake force 0, since the brake hydraulic pressures in the wheel cylinders are held constant, the stopped state of the vehicle body 1 is maintained.

At step S14, it is determined whether or not the accelerator pedal 14 has been depressed. If it is determined positive, the flow proceeds to step S16, whereas if it is determined negative, the flow waits at step S14. It is understood that the accelerator pedal is depressed at time t4.

At step S16, the driving torque Td which is exhibited by the throttle valve 4 being driven by the throttle valve driving unit 6 by the depression of the accelerator pedal 14 is calculated from the engine revolutions and the throttle position, the driving force Fd is calculated from the driving torque Td, and the target brake force Fb* produced when the accelerator pedal 14 is depressed to stop the vehicle body 1 is calculated by substituting Equation (3) by the slope component Fg of gravity acceleration and the driving force Fd.

At step S18, the normally open proportional solenoid valve 88 is driven by the energization amount which is read out from the memory which stores the associations of brake forces and energization amounts as being suitable for producing the target brake force Fb* so as to cause the target brake force Fb* to be exhibited, so that the pressurized brake fluid is controlled to be allowed to flow from the wheel cylinders to the master cylinder 52 in which the brake hydraulic pressure is decreasing by the release of the brake pedal 12 via the normally open proportional solenoid valve 88, whereby the vehicle stopping target brake force Fb* is produced by the brake hydraulic pressures in the wheel cylinders, and Equation (3) is then established, thereby the stopped state of the vehicle body 1 being maintained.

At step S20, it is determined whether or not the gravity acceleration slope component Fg has become equal to the driving force Fd. If it is determined positive, the process ends. If it is determined negative, the process returns to step S16. For example, if the driving torque Fd equals the slope component Fg of gravity acceleration at time t5, the vehicle stopping target brake force Fb* becomes zero, and the normally open proportional solenoid valve 88 is opened, whereby the brake force Fb becomes zero. In this way, the vehicle body 1 does not reverse in any case, and if the driving torque Fd equals to the slope component Fg of gravity acceleration at time t5, the brake force becomes zero, the brake dragging is eliminated. In addition, the driving force Fd becomes larger than the gravity acceleration slope component Fg after time t5, which is accelerated in accordance with the depression amount of the accelerator pedal 14.

Figure 7:
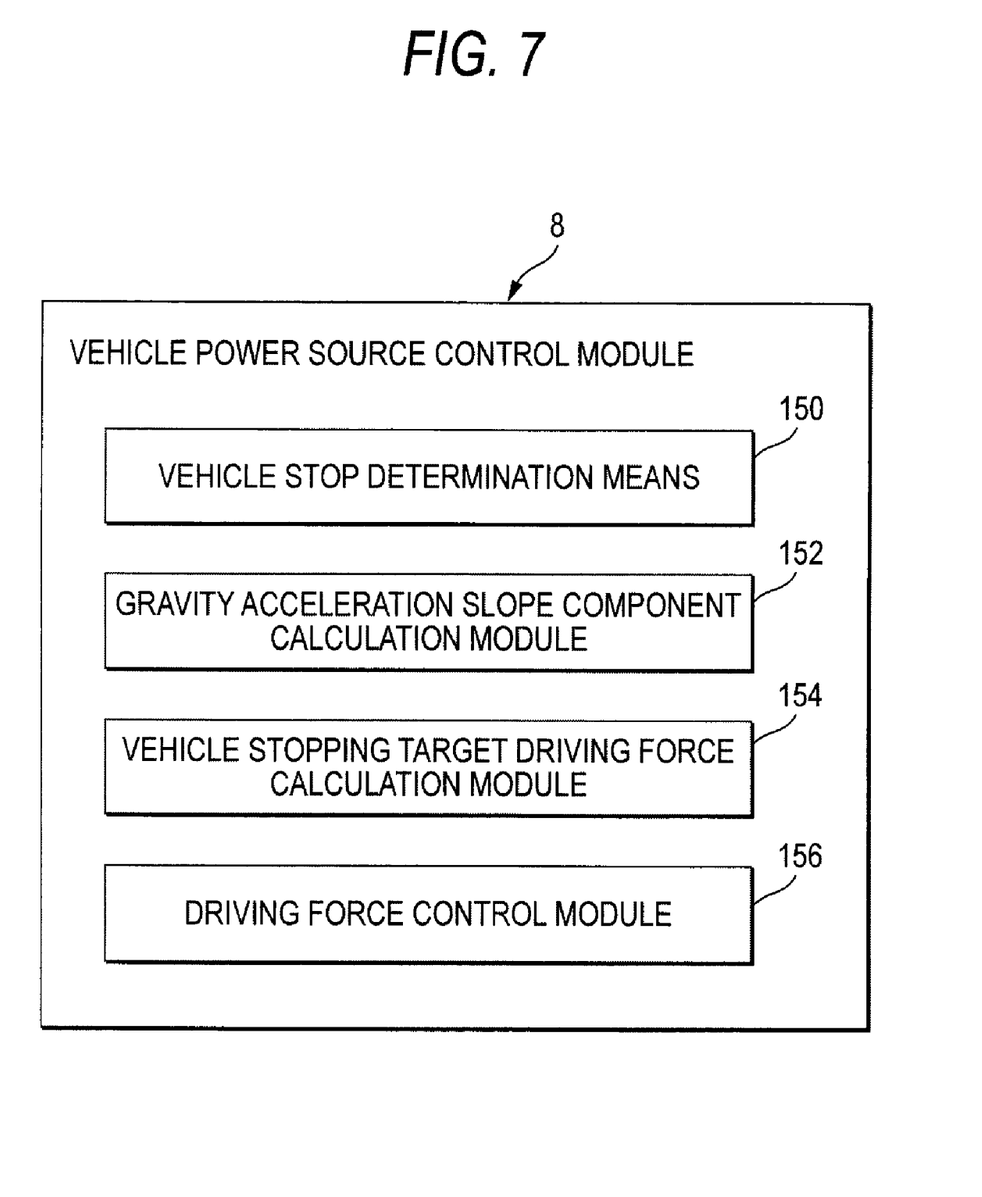
FIG. 7 is a block diagram showing a vehicle power source control according to a second embodiment of the invention.

FIG. 7 is a functional block diagram of a vehicle power source control module which is involved in a vehicle power source control by an ECU 8 according to a second embodiment of the invention. As shown in FIG. 7, the ECU 8 includes a vehicle stop determination module 150, a gravity acceleration slope component calculation module 152, a vehicle stopping target driving force calculation module 154 and a driving force control module 156.

The vehicle stop determination module 150 and the gravity acceleration slope component calculation module 152 are substantially the same as the vehicle stop determination module 100 and the gravity acceleration slope component calculation module 102 which are shown in FIG. 3, and hence, the description of these modules will be omitted here.

The vehicle stopping target driving force calculation module 154 calculates from Equation (4) a vehicle stopping target driving force Fd*(N/kg) which is necessary to stop a vehicle body 1 by compensating for a portion of a brake force Fb(N/kg) which is reduced in association with the removal of pedal effort to allow for the return of a brake pedal 12 and calculates a target driving torque Td* from the vehicle stopping target driving force Fd* so calculated.

$$Fd^* = Fg - Fb \quad (4)$$

The driving force control module 156 controls a throttle valve driving unit 6 to control the degree of opening or position of a throttle valve 4 so that the target driving torque Td* is exhibited. By this action, a driving force equaling the target driving force Fd* is exhibited in a vehicle body 1, and a sum of the exhibited driving force Fd and the brake force Fb becomes equal to a gravity acceleration slope component Fg, whereby the vehicle body 1 stops without reversing. In addition, when the brake pedal 12 is released and the brake force Fb becomes zero, from Equation (4), the target driving force Fd* becomes equal to the gravity acceleration slope component Fg, and a driving force Fd equal to the gravity acceleration slope component Fg is exhibited and maintained until an accelerator pedal 14 is depressed. When the accelerator pedal 14 is depressed, a driving torque corresponding to the driving force equal to the gravity acceleration slope component Fg is added to a driving force matching the depression amount of the accelerator pedal 14.

Figure 8:
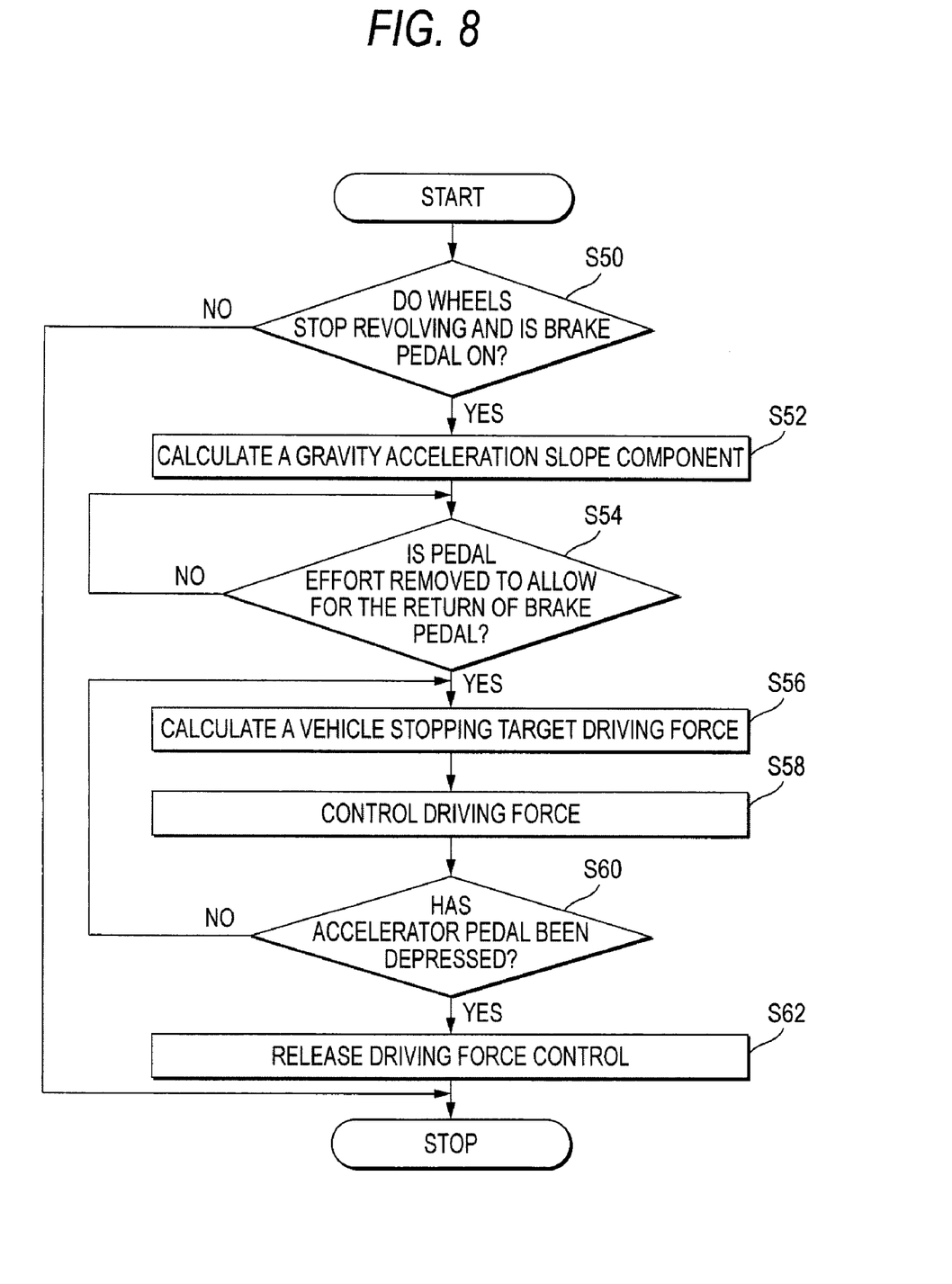
FIG. 8 is a flowchart illustrating a vehicle power source control method according to the second embodiment of the invention.
Figure 9:
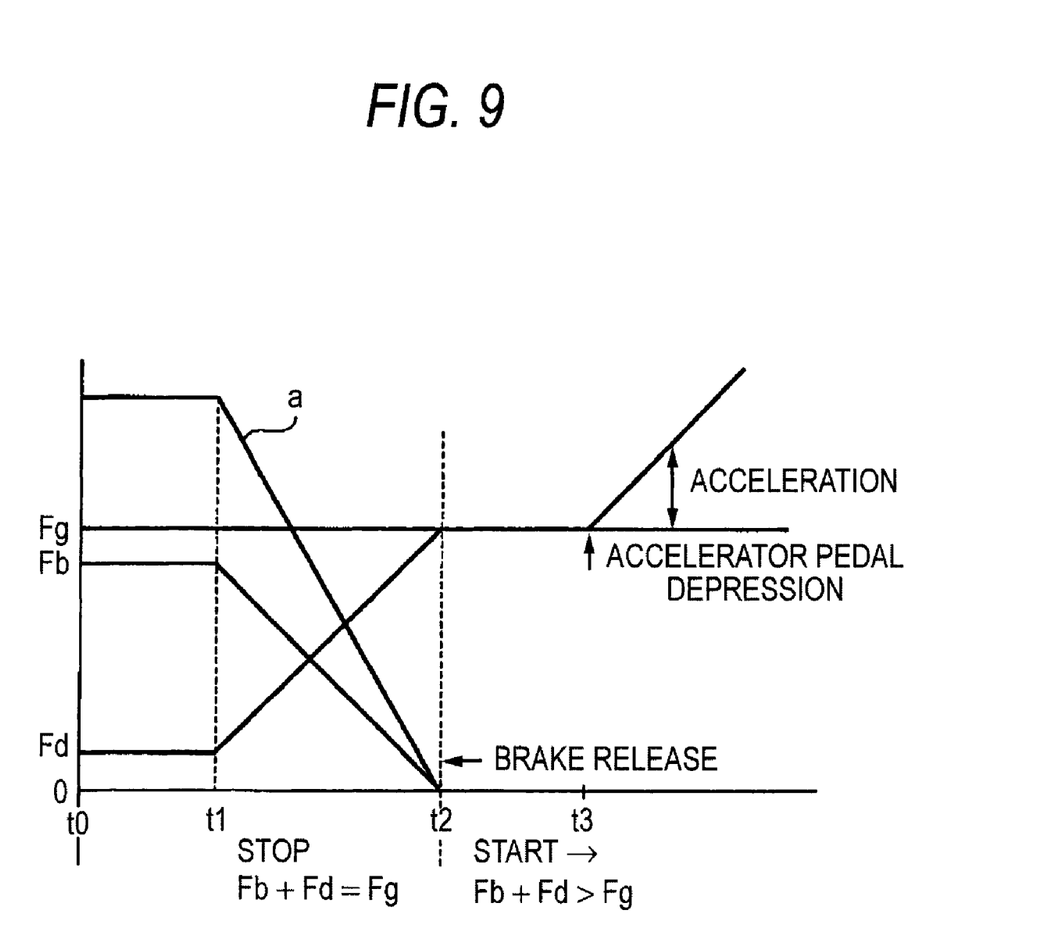
FIG. 9 is a time chart illustrating the vehicle power source control method according to the second embodiment of the invention.

FIG. 8 is a flowchart illustrating a vehicle power source control method. FIG. 9 is a time chart illustrating the vehicle power source control method. In FIG. 9, a reference character "a" denotes a master cylinder hydraulic pressure which is converted into a force which is exerted on a brake disc by the hydraulic pressure in a master cylinder 52. Hereinafter, a vehicle drive brake force control method will be described by reference to these drawings.

At step S50, it is determined whether or not wheel speeds detected by wheel speed sensors 22FL, 22FR, 22RL, 22RR are 0 and wheels stop revolving and whether or not the brake pedal 12 is being depressed. If it is determined positive, judging that the vehicle body 1 is stopping on an uphill, the flow of controlling steps then proceeds to step S52, whereas if it is determined negative, the flow ends. It is assumed that it has been determined that the wheels stop revolving, for example, at time t0 and that the brake pedal 12 is being depressed.

At step S52, the driving force Fd(F/Kg) is calculated based on engine revolutions and throttle position, a total sum of brake forces Fb(N/kg) is calculated from brake torque detected by brake torque sensors 20FL to 20RR, and the gravity acceleration slope component Fg(N/kg) is calculated from Equation (1).

At step S54, it is determined whether or not pedal effort is removed to allow for the return of the brake pedal 12, and if the determination is positive, the flow proceeds to step S56, whereas if it is determined negative, the flow waits at step S54. It is understood that the removal of pedal effort to allow for the return of the brake pedal 12 is started, for example, at time t1.

At step S56, the total sum of brake forces Fb is calculated from the brake torque detected by the brake torque sensors 20FL to 20RR, the vehicle stopping target driving force Fd* is calculated by substituting Equation (4) by the brake force Fb and the slope component Fg of gravity acceleration, and the target driving torque Td* is calculated from the vehicle stopping target driving force Fd*.

At step S58, the throttle valve driving unit 6 is controlled to drive the throttle valve 4 so as to control the throttle position so that a driving torque equal to the target driving torque Td* is exhibited, and the vehicle stopping target driving force Fd* is imparted to the vehicle body 1. Therefore, even though the brake force Fb is reduced due to the brake hydraulic pressure in the master cylinder 52 is reduced by the removal of pedal effort to allow for the return of the brake pedal 12, since the driving force Fd to maintain the stopped state of the vehicle body 1 is exhibited, the vehicle body 1 stops without reversing. In addition, since the brake force Fb becomes zero and the driving force Fd becomes equal to the gravity acceleration slope component Fg at a point in time at which the brake pedal 12 is released, the vehicle body 1 stops without reversing. It is understood that the brake pedal 12 is released, for example, at time t2.

At step S60, it is determined whether or not the accelerator pedal 14 has been depressed. If the determination is positive, the flow proceeds to step S62, whereas if the determination is negative, the flow returns to step S56. It is understood that the accelerator pedal 14 has been depressed, for example, at time t3. Consequently, the driving force Fd is held at the gravity acceleration slope component Fg from time t2 at which the brake pedal 12 is released until time t3 at which the accelerator pedal 14 is depressed, and the vehicle body 1 stops without reversing.

At step S62, the driving torque control is released, and it is controlled that the driving force is made to be exhibited in accordance with the depression amount of the accelerator pedal 14. In addition, the driving force Fd which equals to the gravity acceleration slope component Fg is increased until the depression amount of the accelerator pedal 14 becomes constant. In the event that the accelerator pedal 14 is depressed at time t4, the vehicle body 1 is accelerated in accordance with the depression amount of the accelerator pedal 14. As this occurs, since the driving force equaling to the gravity acceleration slope component Fg is added, there occurs no such situation in which the vehicle body 1 is decelerated even though the accelerator pedal 14 is depressed.

Thus, according to the embodiment of the invention, since the reduced portion of the brake force due to the removal of the pedal effort to allow for the return of the brake pedal 12 is compensated for by the driving force, the vehicle body 1 stops without reversing. In addition, when the brake force becomes zero, since the driving force Fd equaling to the gravity acceleration slope component Fg is exhibited and maintained, the occurrence of brake dragging can be prevented. Since the driving force equaling the gravity acceleration slope component Fg is exhibited when the accelerator pedal 14 is depressed, the vehicle body 1 is accelerated smoothly. Furthermore, since the least driving force Fd necessary for the vehicle body 1 to maintain its stopped state is exhibited, a wasteful fuel consumption by the vehicle body 1 while it is being stopped can be reduced, and the effect of excessive wear of a starter clutch can be eliminated which results in a change in transmission torque characteristics attributed to a change in temperature and properties of lubricating oil which are triggered thereby.

In addition, whether the vehicle body 1 travels forwards or reverses when the brake pedal 12 is released is seen by the sign of a total sum of brake forces Fb which are calculated from the brake torque detected by the brake torque sensors 20FL to 20RR. For example, a brake force resisting the forward direction of wheels 16FL to 16RR, that is, a brake torque in the reverse direction is made to be negative, while a forward brake torque is made to be positive.

In the forward travel on the uphill shown in FIG. 4B, since the forward brake torque resisting the reverse direction of the wheels 16FL to 16RR is exerted, the sign of an output signal of the brake torque sensors 20FL to 20RR becomes positive, and it is seen that when the brake torque becomes 0, the gravity acceleration slope component Fg becomes larger than the driving force Fd, whereby the vehicle body 1 reverses.

On the other hand, in the reverse movement on the downhill shown in FIG. 4C, since a reverse brake torque resisting the forward direction of the wheels 16FL to 16RR is exerted, the sign of output signals from the brake torque sensors 20FL to 20RR becomes negative, and it is seen that when the brake torque becomes 0, the gravity acceleration slope component Fg becomes larger than the driving force Fd, whereby the vehicle body 1 travels forwards.

Consequently, without using an exclusive sensor for determining whether the vehicle body 1 is traveling forwards or reversing, the direction in which the vehicle body 1 moves can be determined by the sign of the total sum of brake forces operated from the output signals of the brake torque sensors 20FL to 20RR when the brake force becomes 0. The operation of preventing the reversing of the vehicle body 1 on the uphill can be implemented before the wheels 16FL to 16RR start to move.

Furthermore, in the event that the direction of brake force and the direction of driving force are opposite, it is understood that the vehicle is stopping on a flat path. This is because since the direction of driving force is seen by seeing which of forward and reverse gears is selected by the gearshift lever and the direction of driving force is seen by the sign of brake force, a vehicle stop on a flat path and a vehicle stop on an uphill can be discriminated.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A control system comprising:
a power source;
a power source output sensor for detecting an output from the power source;
a power source controlling unit adapted to be operated by a driver to control the output of the power source,
wheel brakes;
a brake operating unit adapted to be operated by the driver to operate the wheel brakes;
brake torque sensors which detects a brake torque being generated at the wheel brakes and
a controller which controls an actuator for controlling the output of the power source and brake force of the wheel brakes,
a vehicle speed sensor for detecting a vehicle speed; and
a vehicle stop determination unit which determines a stopped state of a vehicle based on a result of a detection by the vehicle speed sensor, wherein
when the stop determination unit determines that the vehicle is in a stopped state,
the controller calculates an inclination component of gravity acceleration in a longitudinal direction of the vehicle on a road surface on which the vehicle is running based on an output of the power source detected by the power source output sensor and a brake torque detected by the brake torque sensors and
the controls either of the output of the power source and the brake force based on the result of the calculation when the vehicle starts based on an calculation of the brake operating unit and calculation of the power source controlling unit.

2. The control system as set forth in claim 1, wherein
until the power source controlling unit is operated by the driver, the controller controls the actuator to hold constant a brake force at the wheel brakes that is required for stopping the vehicle from a predetermined point in time at which the brake force at the wheel brakes is decreased to a predetermined value based on a brake operation resulting from the operation of the brake operating unit by the driver and
once the power controlling unit is operated, the controller controls the actuator to cause a brake force at the wheel brakes that is required for stopping the vehicle to be exhibited based on a driving force that is exhibited based on the calculation of the power source controlling unit by the driver and the inclination component.

3. The control system as set forth in claim 1, wherein
when the brake force at the wheel brakes is decreased based on a brake operation resulting from the operation of the brake operating unit by the driver, the controller controls the actuator to cause a driving force that is required for stopping the vehicle to be exhibited based on a brake torque detected by the brake torque sensors and the inclination component.

4. The control system as set forth in claim 1, wherein an output Fd of the power source that is used in calculation of the inclination component is a value obtained by:
 calculating a driving torque Td based on a torque converter amplifying rate that is defined based on an engine revolutions and a main shaft rotation speed and multiplying the driving torque Td by a gear ratio and a final reduction gear ratio of a transmission
 dividing the multiplied value by a product of a radius of a tire and a load thereon.

5. The control system as set forth in claim 1, wherein a brake torque Fb that is used in calculation of the inclination component is a total sum of brake forces acting on individual wheels which are each obtained by dividing a brake torque Tb detected by the brake torque sensors by a product of a load and a brake disc effective radius of the wheel.

* * * * *